United States Patent Office 3,249,635
Patented May 3, 1966

3,249,635
LINEAR PHOSPHONITRILIC OXYGEN TERMINATED DERIVATIVES
Kazimiera J. L. Paciorek, Riverside, Calif., assignor to the United States of America as represented by the Secretary of the Navy
No Drawing. Filed Sept. 13, 1963, Ser. No. 308,917
1 Claim. (Cl. 260—551)

The invention herein described may be manufactured and used by or for the Government of the United States of America for governmental purposes without the payment of any royalties thereon or therefor.

The present invention relates to a method for preparation of oxygen terminated phosphonitrilic derivatives of the general formula

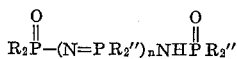

in particular

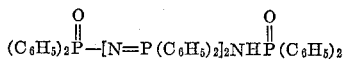

to be used in conjunction with acetylacetonates of divalent metals; e.g., zinc and beryllium in synthesis of thermally stable coordination polymers of the type described by B. P. Block et al., J. Am. Chem. Soc., 84, 3200 (1962), and usable as high temperature stable resins.

The member of the class of compounds

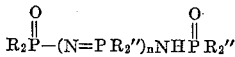

described in this invention was prepared by V. V. Korshak et al., Vysokomolekulyarnye Soedineniya, II, No. 3, 377–385 (1960), by the following reaction sequence:

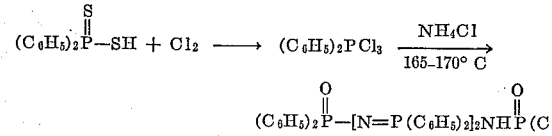

However, the separation of the product from this reaction mixture is tedious and yields are uncertain. The present invention as disclosed herein is much less complicated and the product can be isolated very readily.

It is an object of the invention to provide a new method for the preparation of oxygen terminated phosphonitrilic derivatives of the general formula

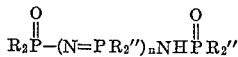

Another object of the invention is to provide a new method for the preparation of

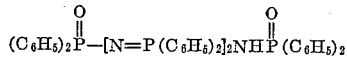

Other objects and many of the attendant advantages of this invention will become readily appreciated as the same becomes better understood by reference to the following detailed description.

The starting material

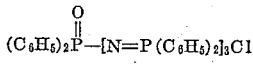

for this invention is described in copending patent application Serial No. 308,916 filed September 13, 1963, for Linear Substituted Phosphonitrilic Derivatives.

The invention disclosed herein is described in the following procedure used to prepare

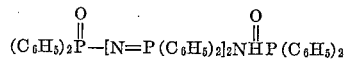

1.5 g. of

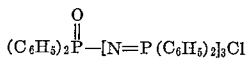

was treated with aqueous acetonitrile (refluxing (80° C.)); filtered, then recrystallized from acetonitrile when 1.30 g. (95% yield) of

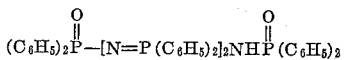

was obtained (M.P., 171–172° C.).
Calc. for $C_{48}H_{41}P_4N_3O_2$: C, 70.67; H, 5.03; N, 5.12; P, 15.21; Mol wt. 815. Found: C, 70.04; H, 5.32; N, 5.22; P, 15.18; Mol wt. 810 (in benzene) using Mechrolab osmometer.

The overall reaction sequence can be represented as follows:

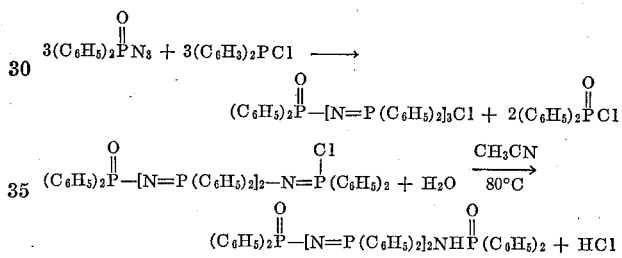

Obviously many modifications and variations of the present invention are possible in the light of the above teachings. It is therefore to be understood that within the scope of the appended claims the invention may be practiced otherwise than as specifically described.

What is claimed is:
The method for preparing

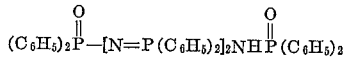

comprising reacting

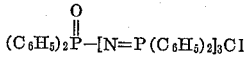

with aqueous acetonitrile by refluxing to yield

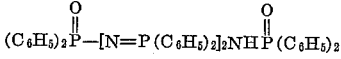

having a melting point of 171–172° C. when recrystallized from acetonitrile.

No references cited.

WALTER A. MODANCE, *Primary Examiner.*
HARRY I. MOATZ, *Assistant Examiner.*